Patented Apr. 9, 1929.

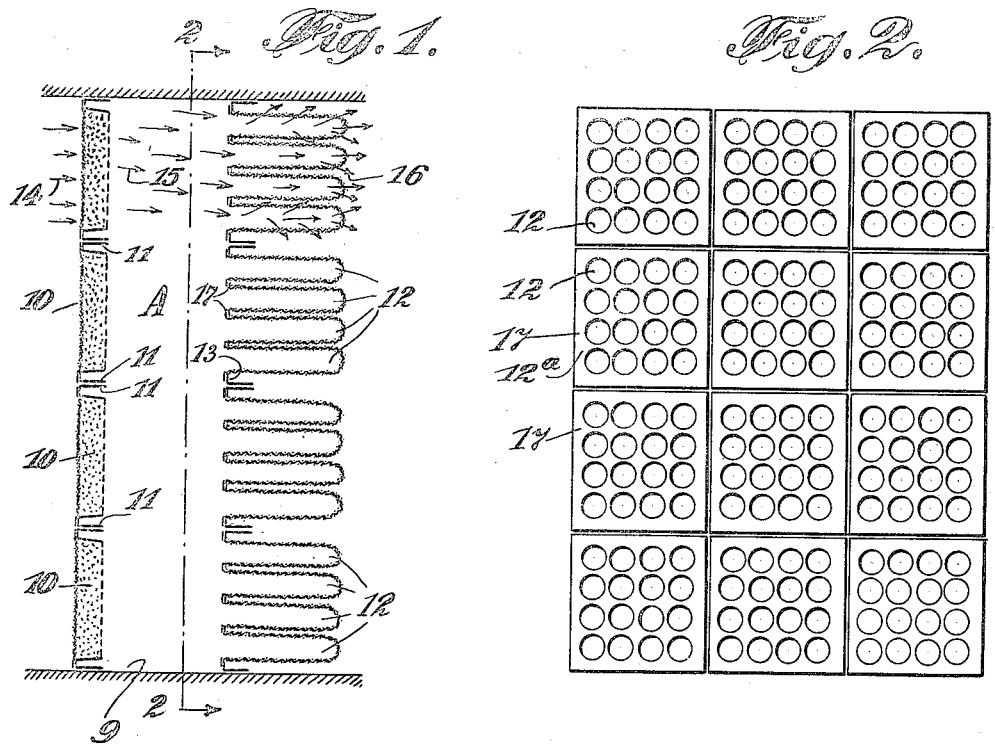

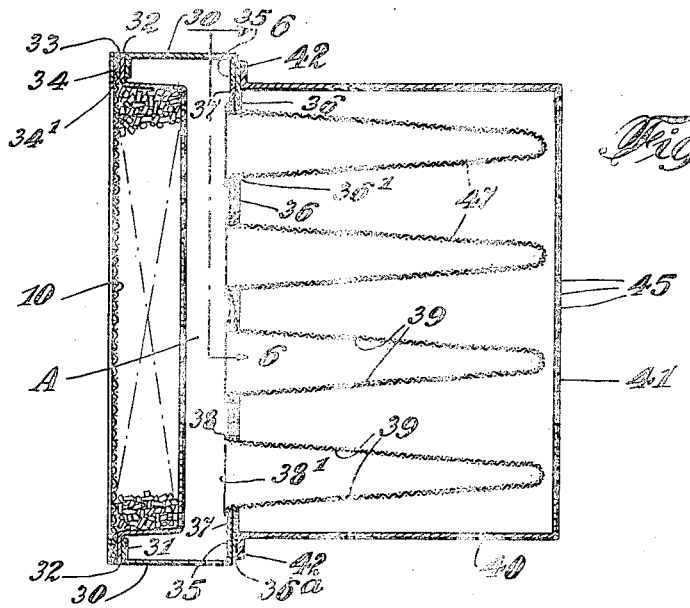
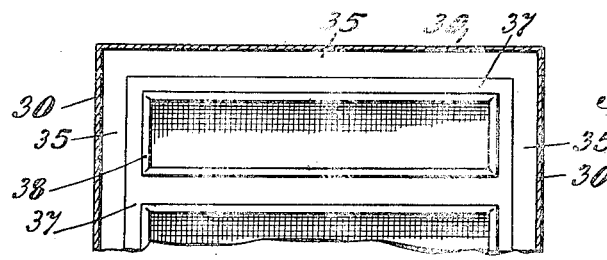
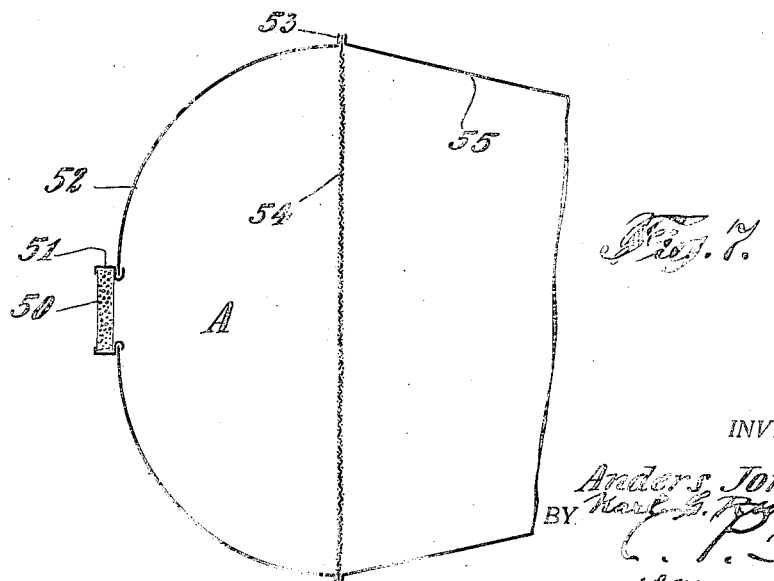

1,708,065

UNITED STATES PATENT OFFICE.

ANDERS JORDAHL AND KARL G. RUNBACK, OF NEW YORK, N. Y.; HILMA RUNBACK, ADMINISTRATRIX OF SAID KARL G. RUNBACK, DECEASED, ASSIGNORS TO MID-WEST STEEL & SUPPLY CO. INC., OF NEW YORK, N. Y., A CORPORATION OF NEW YORK.

FILTER.

Application filed December 28, 1923. Serial No. 683,119.

This invention relates to gas and air filters and more particularly has for its object to provide a filter which will enable even the very finest particles of dust to be separated from the gas.

It has heretofore been proposed to filter air and other gases by passing them through a system of water sprays. It has also been proposed to use other filters consisting of suitable enclosing frames and having a metallic filter medium with viscous coated surfaces, the filter medium being preferably held between screens.

The dust-charged gas, passing through such filters, had the dust separated from it to a marked degree and had given universal satisfaction for the purpose intended. The efficiency of such filters is very high, but it has been found highly desirable in certain important installations to remove from the air or gas also the last traces of very fine dust which cannot be caught by even the most efficient air and gas cleaners now used.

As an example may be stated the case of the automatic telephone exchanges where even the smallest dust particles contained in the air used for ventilation purposes are very harmful, as they will prevent the proper functioning of the many minute contacts and other highly sensitive parts.

It is the object of this invention to provide means which will accomplish this purpose efficiently and yet in a simple and thoroughly practicable manner.

Cloth or bag filters of suitable textile structure are excellent gas and air cleaners when new and in a clean state, as far as the actual catching of the dust is concerned, and they have often been used for this purpose. They have, however, many serious disadvantages which render them unsuitable and impracticable for the catching of coarse dust or for the catching of such comparatively large dust quantities as are contained in the ordinary atmospheric air. The dust gathered on a filter cloth very quickly fills the small air passages in and between the threads, thus unduly increasing the resistance to the flow of the air. After this has taken place the force of the air currents becomes so great in places that it forces the dust particles through the cloth and into the clean air chamber. The coarser dust particles travel along with considerable momentum and, having fine, sharp edges (sand, grit, carbon etc. which always form part of the dust in air and gases) they have a tendency to cut the fiber of the cloth, thus enabling the following coarse particles to travel through and each time enlarging the holes in the filter cloth.

The problem cannot, therefore, be solved by the use of cloth filters directly exposed to the atmosphere. Even the improved type of bag filters which are kept in operation by being automatically cleaned by a combined mechanical action and by forcing air through the bags from the clean to the dirty air chamber will not solve the problem because even in these the cloth is quickly destroyed by the cutting action of the coarser dust particles.

Nor can the problem be solved by transposing after each other a series of viscous coated metal filters because this would involve increasing the resistance beyond the permissable limits and still one would not be able to obtain the necessary degree of filtration.

If, however, cloth filters are exposed to air and gases which have already gone through an efficient filtering process, in which all coarse dust particles and the larger percentage of the fine ones have been removed, and if the air or gas before striking the cloth filter is passed through a quiescent chamber in which the air becomes perfectly still and quiet, then the cloth filter becomes an extremely efficient and practicable filter medium. Under such conditions, the remaining fine dust particles in the air, as it leaves the quiescent chamber, are easily caught on the fuzz or nap of the cloth and there are so comparatively few of these dust particles that the filter can stay in operation over a long period of time before the resistance to the flow of air or gas will become materially increased.

We, therefore, propose to combine in cooperative relationship a filter apparatus in which the largest percentage of the dust particles are caught on the primary filter, and the last remaining particles on the secondary filter, in a manner that the primary filter will take up the largest quantity of dust, including also very fine particles, and thereafter have secondary filters of suitable texture take up the remaining fine particles in the air after it has passed through the primary filter and an intermediate quiescent air chamber. Such a combination of parts enables the secondary cloth filters to be exposed only to the finer particles of dust, in consequence it will take a longer time to cover the exposed surfaces thereof. Also finer particles are not as likely to tear the fibers as would the heavier particles, since the latter acquire considerable momentum in their movement.

Our invention consists essentially of the combination of a viscous filter or other suitable primary cleaner, combined with a secondary filter to take up the finer particles of dust still remaining after the air passes through the primary cleaner. We believe that we render this combination successful in that we provide between the primary and secondary filters a reservoir of quiescent air whereby the air has removed from it, any circulation, or velocity or momentum and thereby the fine particles in the air are no further entrained but are capable of being readily separated from the air by the interposition of a medium having a surface nap and a finely woven texture. The actions described are augmented by providing the secondary filter with a greater exposed entrance filtering area than the exposed entrance filtering area of the primary area, whereby a reduction in velocity of flow takes place. This reduction follows also as a result from the provision of the quiescent enclosed air space between the primary and secondary filters, whereby the action of diffusion in distinction to circulation becomes dominant.

Our invention also covers a simple and practical arrangement of a cloth filter, which is necessary in order to render the combination described above feasible and practicable in operation.

An installation of this nature must often be capable of being kept in continuous operation and still the cloth filters must be removed for cleaning from time to time. To meet these requirements we arrange our cloth filters in a plurality of small, easily handled units, preferably in the form of conical bags and we attach these removably to their carrying frame.

Our invention also covers the combining of a plurality of filter bags on one removable and interchangeable unit frame. One or more such units (consisting of a frame and of a plurality of bags) are kept in reserve for each installation, and when it becomes necesary to clean some of the bags, the unit of which these bags form a part, is taken out and immediately replaced with a clean reserve unit without having to discontinue or stop the operation of the filter installation. The dirty unit may be cleaned by shaking or by blowing air through the bags in a reverse direction, and when at great intervals an even more thorough cleaning of the bags is necessary, the individual bags are disengaged from the unit frame and washed.

A feature of the present invention is the utilizing of the bags forming the secondary filter to increase the cubic content of the intermediate quiescent air chamber, thus insuring the proper fall of velocity of the air flowing through the filter.

For this purpose and others, our invention will be hereinafter described, shown in the drawings, and finally pointed out in the claims.

In the accompanying drawings,—

Fig. 1 is a diagrammatic view showing the arrangement of the primary filters, the quiescent air space, the reservoir and the secondary filters;

Fig. 2 is a vertical transverse section in line 2—2 of Fig. 1;

Fig. 3 is a diagrammatic view of a primary filter, quiescent reservoir and secondary filters, arranged in a different manner than shown in Fig. 1;

Fig. 4 is a diagrammatic view of a primary filter, quiescent reservoir, and secondary filters, of still a different form than shown in Fig. 3;

Fig. 5 shows a primary filter, a quiescent reservoir, and secondary filters encased within an incombustible, fire-proof casing, forming in its entirety a separate entity;

Fig. 6 is a partial section taken on line 6—6 of Fig. 5;

Fig. 7 is a digarammatic view of a primary filter, quiescent reservoir, and a secondary filter.

Similar references indicate corresponding parts through the various views.

Referring to the drawings and more particularly to Figures 1 and 2, the primary filters 10 consist of a frame 11 supporting therein primary walls between which viscous coated filter media are held. The frames 11 are so arranged that one filter can be placed upon the other and end to end, as shown in Figure 1, whereby the frames are self-supporting, that is, one frame supports the frame above it. Suitable connecting means, as bolts and the like, may be provided to join the frames together. The method of placing these frames on top of each other and laterally to each other is also utilized for holding the secondary filter as shown in Figure 2, and of course, they are so closely placed that no air can pass between the frames themselves.

The filters are arranged one on the other, as shown in Figure 1, so as to provide a transverse wall to the channel 9, and so as to compel all the air passing through the channel 9 to pass through the interstices of the primary filters 10. After the air has passed through these filters, it has been cleaned of its dust to a large extent, and for all practical installations the efficiency is so high as to respond to the requirements. In order, however, to remove even those fine particles of dust that still remain in the air, after its exit from the filters 10, a battery of secondary filters is provided, and for this purpose frames 13 are arranged, which are again self-supporting, as indicated in Figure 2, and which in general are of the same construction as indicated in Figure 2 as the frames 11 of the primary filters. These frames 13 support metallic incombustible members 12ª, which are provided with a plurality of openings 17, as shown in Figure 2, the surrounding metal of the openings supports the ends of cloth filters 12, arranged in elongated fashion or relatively cylindrical shape, with rounded ends, as shown in Figure 1.

It is essential to provide between the primary filters 10 and the secondary filters 12 a space, in which the air may form itself into a quiescent condition. As the air leaves the filters 10 it has more velocity, and as it leaves these filters, it does so in unnumerable small streams. If such streams were continued as jets or currents, the fine dust particles carried in the same would have no opportunity of being separated from the air streams, or that is precipitating or settling out of such streams. If air, with suitable momentum, entraining these particles of dust, would immediately strike a cloth filter or the like, the momentum would be such as to force the dust through the very fine interstices of the cloth filter. To overcome this disadvantageous condition, the enclosed quiescent space or reservoir is provided, and this enables all the fine streams or jets or currents of air entraining still very minute quantities of dust of a very fine character to diffuse into one large quiescent volume of air. This diffusion of the air abstracts from the air velocity thereby reducing its momentum, and thereby enables the fine particles of dust to settle freely, and so to separate from the air as the air encounters a cloth filter or the like. With this condition in mind, the air passes from the quiescent chamber A of Figure 1 in the general directions of the arrows 15 into the interior of the cloth filter 16, and contacts with the same in a very gentle manner, not in a forced manner, and this gentle contact permits the air to pass through the interstices of the cloth filter, but causes the dust to remain thereon. The air, thus purified, leaves the cloth filter 12, as indicated by the arrow 16. The entering of the air into the primary filters is indicated by 14, the air passing through the enclosed quiescent reservoir A by the arrows 15, and the air as it leaves the filters 12 by the arrows 16, but by the indication of the air flow by means of these arrows, it is not intended to have it understood that a positive circulation takes place. There is some flow of air, but it is rather a flow incident to diffusion, than to circulation.

It will be noted that exposed entrance filtering area of the secondary filter or filters is much larger than the exposed entrance filtering area of the primary filter or filters, and again the velocity of flow becomes reduced thereby.

In Figure 3, a modified form of structure has been shown, in which a frame 18 is adapted to support both the primary filters 10 and the secondary filters 12. The primary filters are of the usual type in which the walls of the filter cell at the entrance side are provided with laterally projecting flanges, and these flanges are adapted to be connected with inwardly projecting flanges 19 at one side of the frame 18 by any usual form of fastening means. Similarly, the secondary filter 12 is provided at opposite sides thereof with outwardly projecting flanges to be connected by suitable fastening devices with the inwardly extending flanges 20 at the opposite side of the frame 18. Openings 17 are provided between the bases of the cloth filters and the quiescent air enters therein, and then into the filters 12. In general, the shape of the filters 12 in Figure 3, is that of the filters 12 in Figure 1.

In Figure 4 still another form of composite filter has been shown. In this construction the secondary filter consists of a plurality of members 21 and 23, and arranged respectively at opposite ends of the length of the cloth filter. These members 21 and 23 are joined by pocket walls formed of cloth, whereby the walls 21, 22 and 23 constitute the secondary filter. The quiescent reservoir A is interposed between the primary and secondary filters.

In order to provide a fire-proof enclosure and also to provide a composite unit consisting of a primary filter, a quiescent reservoir, and a secondary filter, the structure shown in Figures 5 and 6 is provided, which consists of a common frame 30, having flanges 31 and 35. These frames are so arranged that they may be placed one on the other in the general manner hereinbefore described, and as shown in Figures 1 and 2. The primary filter 10 has a flange 32, which abuts against the flange 31, and its foraminous front 33 seats on the flange 32. In front of the foraminous member 33 a frame 34 is arranged, which has an opening 34' in registration with the operative part of the primary filter 10. The primary filter with its flange 32, its foraminous front 33, and its frame 34 is a separate entity, and as such may be readily applied by any suitable means as bolts or the like to the flange 31 of the frame 30. The secondary filter consists of a frame 37, having a large number of openings of elongated shape 38, over which the end 38' of the cloth filter 39 fits. This frame 37 with its openings 38 seats upon a support 36 which has openings 36' in substantial registration with the openings 38, and this support 36 is permanently or removably attached to the flanges 35 of the frame 30. To the flanges 35 of the frame 30 flanges 42 of an extension member 40 of incombustible material are secured, which extends rearwardly a distance larger than the length of the cloth filter 39, and provides a casing for the filters. This extension 40 is provided at its end with a foraminous wall 41, which readily permits the passage of air through its openings 45, but which acts as a fire-proof protector against the entrance of a flame or the like into the interior of this composite filter. The action of this wall 41 with its openings resembles the action of the well known Davis Safety Lamp.

The secondary filters 39 are made of cloth or the like of very fine texture, and are preferably shaped in the manner shown in Figure 5 of the shape of a pointed cone with a rectangular elongated base, as shown in Figure 6. This formation of the filters with the rectangular base and a conical shape provides an efficient filter with a minimum of material and a maximum of effect, since the walls 47 of the filter 39 diverge and thereby permit the ready passage of the air.

The primary filter 10 and the secondary filters 39 are so arranged within the frame 30 as to provide therebetween a quiescent chamber A, which enables, as hereinbefore stated, the separate streams of air passing out of the primary filter to reach a quiescent state, and thereby remove therefrom any momentum, so that the heavier dust particles are precipated in the chamber A while the lighter dust particles are carried in separated relation into the pockets of the cloth filters. The very fine dust particles thus being dispersed in relation to the air medium in relative colloidal state may be separated and entrapped by the fine texture of the cloth, which entraps the fine dust but permits the air to pass therethrough. The quiescent state of the air together with the very fine particles of dust, is in such relativity that there is no momentum in the dust particles, and hence there is no impingement of the dust particles upon the cloth, such as to destroy any of the fine fibres, as would be the case with larger particles of dust, and with a momentum of the dust. Furthermore, as the fine dust particles are relatively small in number when they reach the cloth filters, since almost all of the dust has been extracted in the primary filter, the layer of fine dust is so small as not to clog up the cloth filters within any reasonable length of time. If such cloth filters be used with air which has not been primarily sifted, the cloth filters would almost immediately clog up and be rendered useless. This very fine layer of dust, however, spreads itself over the very large interior surfaces of these cloth filters, and thus enables the cloth filters to be utilized for a very long time, before requiring cleaning.

It will thus be seen that the composite filter described consists of a primary filter, which may be water spray air washers, a viscous coated metal filter or any other air and gas cleaning device, the quiescent air space and the secondary filters some times combined with a fire-proof container. The entire structure is made of a non-combustible material, with the exception of course, of the textile fabric used in the cloth filters themselves, although these can also be of non-combustible material as, for instance, mineral wool, but in any event the cloth filters can be protected by the enclosing casing described.

The secondary filters may be removably attached either to the front or to the rear face of the rear flange 35 of the frame 30. If it is desired to remove the secondary filters from the "dirty" air side for the purpose of cleaning, they are attached to the front of the flange 35, and if it is to be removed from the "clean" air side they are attached to the rear face of flange 35. In a similar manner casing 40 can be removably attached to the main frame 30.

Another form of an embodiment of our invention is shown in Figure 7, in which the primary filter 50 is enclosed within a frame 51, and to this frame is secured a flaring member 52 so as to provide a quiescent chamber or reservoir A. The flaring chamber wall 52 is provided with a flange 53, and to this is suitably secured a membrane 54 of a fine texture cloth, which acts as a secondary filter. For the purpose of conducting the clean air, a diverging chamber wall 55 is arranged, which may be of any suitable shape, and as shown as broken off in the drawing, to indicate that any suitable shape may be given thereto. The primary filter 50 may exemplify either the form of filter shown in the drawings, Figures 1 to 6, or any other form of filter which has for its object and results in extracting from the air the largest possible amount of dust. The streams of air passing through and out of the primary filter 50 gather in the chamber A, and by diffusion and expansion and quiescence causing the dust particles to be held in colloidal suspension and in quiescent state, so that the air itself may readily pass through the filter 54, but the dust particles held by the membrane filter 54. This embodiment of the invention, as shown in Figure 7, shows cooperative functions, and the production of a combined function due to the relations of the primary and secondary filters, in conjunction with the connecting reservoir A. The operation of the reservoir A co-acting with the primary filter, and also co-acting with the secondary filter, bring about a new function and a new result different from the separated functions of the filter themselves as has heretofore been shown.

This invention may be developed within the scope of the following claims without departing from the essential features of the same, and it is desired that the specification and drawings be read as being simply illustrative of the invention, and not in a limiting sense, except as necessitated by the prior art.

We claim and desire to secure by Letters Patent:

1. An air and gas filter containing in combination: a primary filter having its entrance surface in free and open communication with the atmosphere, and consisting in a layer of filtering media, which allows but a restricted flow of the air; a secondary filter, disposed in spaced relation to the primary filter and having a larger exposed entrance filtering area, than the exposed entrance filtering area of the primary filter; and an intermediary quiescent air chamber, through which the air passes from the end of the primary filter to the beginning of the secondary filter, and said secondary filter having pocket-like enlargements for the collecting of the dust, which is precipitated or separated out of the air during its expansion from the primary filter and its passage through the secondary filter.

2. An air and gas filter containing in combination: a primary filter having its entrance surface in free and open communication with the atmosphere and being composed of a plurality of frames superposed one above the other and containing viscous coated filtering media which allows but a restricted flow of the air; a secondary filter disposed in spaced relation to the primary filter and having a larger exposed entrance filtering area than the exposed entrance filtering area of the primary filter and being composed of a plurality of cloth filters extending baglike in the direction of the flow of the air; and an intermediary quiescent air chamber through which the air passes from the end of the primary filter to the beginning of the secondary filter, and said secondary filter having pocket like enlargements for the collecting of the dust, which is precipitated or separated from the air during its expansion from the primary filter and its passage through the secondary filter.

3. In an air and gas filter, an air receiving chamber, a primary filtering unit mounted in one side of said chamber having an entrance surface entirely open to the atmosphere and containing filtering media restricting the velocity of the air flow into said chamber, and a plurality of air receiving pockets projecting from the opposite side of said chamber having foraminous walls and open ends spaced from the primary filter unit in communication with said chamber to receive air therefrom in a substantially quiescent state.

4. In an air and gas filter, an air receiving chamber, a primary air filter unit supported upon one of the side walls of said chamber and having its egress side in communication therewith, said filter unit containing air filtering media restricting the flow of air therethrough and reducing its velocity of egress into said chamber, and a secondary filter unit consisting of a plurality of air receiving pockets having open ends communicating with said chamber in spaced relation to the egress side of the primary filter, said pockets having foraminous walls and adapted to receive air from said chamber in a substantially quiescent state.

In testimony that we claim the foregoing as our invention, we have signed our names hereto.

ANDERS JORDAHL.
KARL G. RUNBACK.